United States Patent

[11] 3,543,990

[72] Inventor William S. Fortune
 14250 Dearborn St., Panorama City,
 California 91402
[21] Appl. No. 712,748
[22] Filed March 13, 1968
[45] Patented Dec. 1, 1970

[54] VACUUM DESOLDER IMPLEMENT
 10 Claims, 6 Drawing Figs.
[52] U.S. Cl..................................................... 228/20,
 228/19, 228/22
[51] Int. Cl........................................................ B23k 1/00,
 B23k 5/22
[50] Field of Search........................................... 228/20, 22,
 19

[56] References Cited
UNITED STATES PATENTS
3,393,854 7/1968 Fortune...................... 228/20

Primary Examiner—John F. Campbell
Assistant Examiner—Robert J. Craig
Attorney—Daniel T. Anderson ABSTRACT: The specification discloses a small, hand held, cylindrical, vacuum stroke tool for removing molten solder. A trigger mechanism carried by the cylindrical body may hold a spring-loaded piston near the tip, solder inlet end of the tool. A hollow, cylindrical, cocking plunger extends out of the opposite end of the body and is displaceable axially to push the piston forwardly until it engages the trigger mechanism. The cocking plunger, coupled to the piston by an axially-tensive spring is then pulled rearwardly and locked in place. When the trigger mechanism is actuated to produce the solder removing vacuum stroke, the piston flies back and strikes the forward end of the cocking plunger. The piston and the cocking plunger are constructed so that the indicated impact unlocks the cocking plunger thus enabling it to be moved forwardly for a subsequent cocking action.

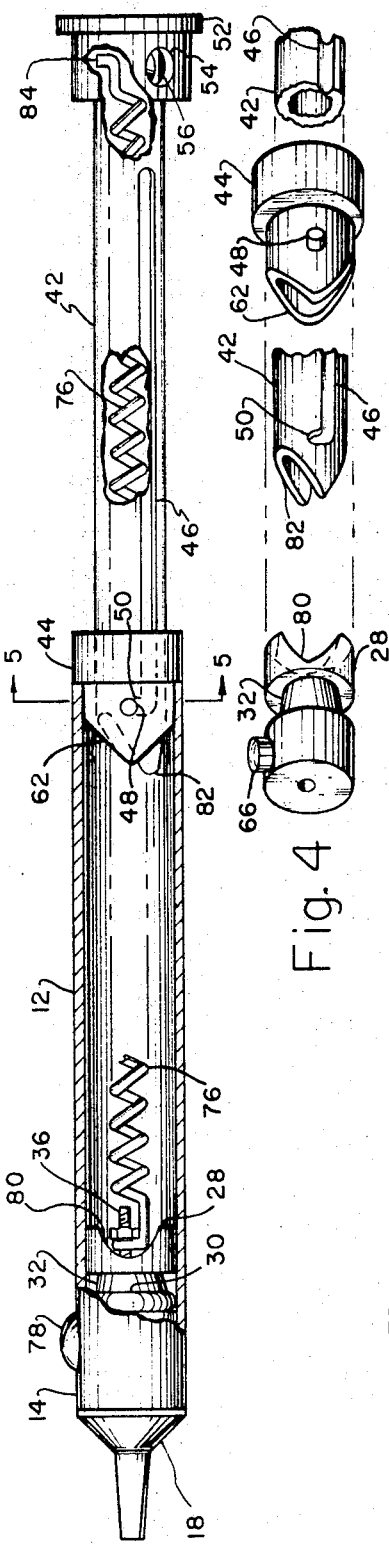
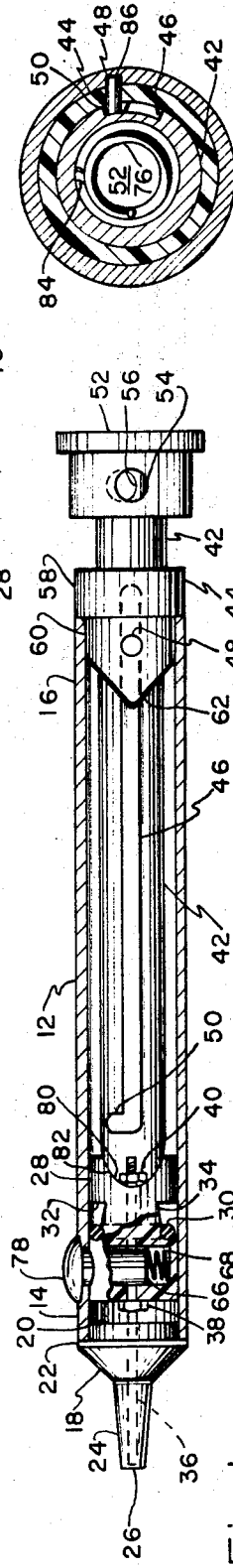
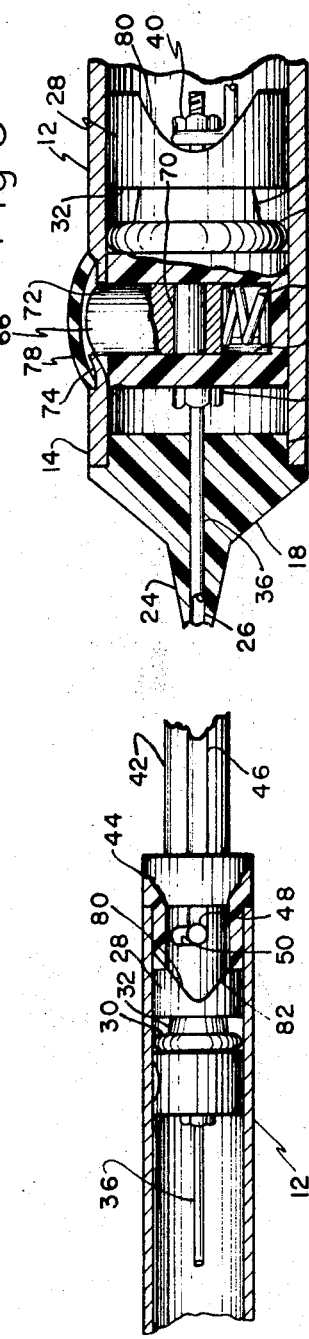
William S. Fortune
INVENTOR 3,543,990

VACUUM DESOLDER IMPLEMENT

BACKGROUND OF THE INVENTION

1. Field of the Invention

This invention relates generally to the removal or lifting of small quantities of mobile substances such as particulate, liquid, or molten matter and more particularly to improvements in apparatus for removing molten solder from electrical connections. The improvements claimed relate to those shown in U.S. Pat. Nos. 3,114,026 and 3,263,889. However, although the present invention finds particularly useful application in the field of soldering, desoldering, and "rewiring" in an electronic laboratory, maintenance shop, factory or hobbyist bench; and although in the cause of brevity and clarity, most of the following discussion and description of examples of the invention are directed theretoward, it is expressly to be understood that the advantages of the invention are equally well manifest in other fields, as indicated above, where a mobile substance is to be removed from a limited or particular portion of an object.

2. Background of the Invention

In the electrical arts as mentioned, it is often desired to desolder an electrical connection such as, for example, a wire-wrapped terminal, a wire to circuit-board eyelet, or the like. The removal from the connection of the molten solder without dropping or splattering it onto other portions of the equipment is generally essential. Blowing or shaking the molten metal away, is therefore not an acceptable practice; and the high surface tension associated with the solder precludes, at least practically, its removal by other than vacuum techniques. Furthermore, the problem is aggravated by the requirement that the solder be removed without application of cool or heat conductive means before the mechanical connection such as a wire-wrapped terminal may be taken apart.

Various nonportable central vacuum systems and highly portable and efficient hand held vacuum stroke tools as described in the referenced patents have successfully solved a number of the prior art desoldering problems. The device shown in the first of the above patents includes a thin-walled cylinder housing a spring-loaded vacuum-producing piston which is connected to an axial-cocking plunger shaft which passes through a bushing at the upper or rearward end of the cylinder and is terminated by a knob. The bushing includes a trigger mechanism which cooperates with the cocking shaft to hold the piston, against spring force, near the forward solder inlet tip end until the trigger is depressed. When thusly actuated, the piston is forced by the spring to "flyback" to the upper, bushing end of the cylinder body. The resulting vacuum stroke impulse of airflow through the tip end draws the molten solder therewithin. The apparatus may then be recocked for a subsequent vacuum stroke.

As indicated, these devices have advanced the state of the art and have solved certain aspects of the desoldering problems outlined; however, they suffer from some disadvantages in some applications due to the recoil or flyback action of the piston-cocking shaft-knob assembly during the vacuum stroke. The cocking shaft which functions as a connecting rod between the piston and the cocking knob must be heavy enough and strong enough to cock the piston against a relatively strong loading spring. Also the cocking knob must be large enough and soft enough for comfortable repeated cocking cycles by the hand of the operator. These criteria cause the flyback mass to be relatively large compared to the thin-walled cylindrical housing body; consequently, the outer housing suffers a recoil causing a deflection of the solder inlet tip away from the location of the molten solder.

Another disadvantage of the abrupt flyback of the shaft and knob is that the eye of the operator during the vacuum stroke is typically disposed near thereto in a position causing risk of eye impact injury.

some of these disadvantages have been overcome by the teachings of the latter of the referenced patents; however, the devices constructed in accordance therewith are typically somewhat complex and costly.

It is, accordingly, an object of the present invention to provide improved desoldering apparatus which is not subject to these and other disadvantages and limitations of the prior art.

It is another object to provide such apparatus which, while providing a high amplitude of impulse airflow, has no exposed flyback portion and a very low inertia associated with the flyback portions thereof causing a negligible deflection of the tool during its vacuum stroke.

It is another object to provide such apparatus which is low in cost and simple, rugged and reliable in its structure and performance.

It is another object to provide such apparatus which, after each vacuum stroke, is automatically fully enabled for recocking.

It is another object to provide such apparatus in which the profile of airflow versus time during the vacuum stroke is adjustable over a wide range.

It is another object to provide such apparatus in which the operator's hand may be disposed to hold the implement closely to its tip end in pencil holding fashion, for improved precision use thereof.

It is another object to provide such apparatus which is automatically self cleaning with each cocking cycle.

SUMMARY OF THE INVENTION

Briefly, the above and other objects of the invention are achieved in accordance with the structural aspects of an example of the invention which includes a handheld, thin-walled cylindrical body having a forward, solder inlet tip end and a rear, bushing end. A piston is disposed within the cylindrical body and its rapid, spring-propelled displacement rearwardly causes a solder-pulling flow of air inwardly through the inlet tip.

A cocking plunger supported by the bushing end is of the character to displace the piston forwardly to a position near the tip end where a trigger mechanism carried by the cylindrical body holds it securely against rearward motion until the trigger is actuated to release it. The cocking plunger is then pulled rearwardly for approximately the length of the cylindrical body. A tension spring is connected between the piston and the cocking plunger whereby such rearward displacement of the latter, a strong rearward force is applied to the former. The cocking plunger and the bushing are of the character to achieve a locking action for the cocking plunger to hold it axially from being pulled forwardly by the tension spring, this locking mechanism being of the character to be automatically unlocked when impacted by the piston during its flyback cycle upon release by the trigger. The implement, by cooperative interaction of these means is thereby totally enabled automatically for recocking in preparation for an immediately subsequent vacuum stroke.

Further details of these and other novel features and their principles of operation and cooperation as well as additional object and advantages of the invention will be made apparent and be understood from a consideration of the following description when taken in connection with the accompanying drawing which is presented by way of an illustrative example only.

BRIEF DESCRIPTION OF THE DRAWING

FIG. 1 is a longitudinal sectional view of an example of a vacuum desolder implement constructed in accordance with the principles of the present invention;

FIG. 2 is an enlarged sectional view of a portion of the structure shown in FIG. 1;

FIG. 3 is a longitudinal sectional view 16 of the structure of FIG. 1 shown in a cocked state;

FIG. 4 is a schematic perspective view of a portion of the structure of FIG. 3;

FIG. 5 is a cross-sectional view of a portion of the structure of FIG. 3 taken along the reference lines 4–4 thereof; and FIG. 6 is a longitudinal sectional view of a portion of the structure of FIG. 3 after a vacuum stroke.

DETAILED DESCRIPTION OF A PREFERRED EMBODIMENT

With specific reference to the FIGS. in detail, it is stressed that the particulars shown are by way of example and for purposes of illustrative discussion only and are presented in the cause of providing what is believed to be the most useful and readily understood description of the principles and structural concepts of the invention. In this regard, no attempt is made to show structural aspects of the apparatus in more detail than is necessary for a fundamental understanding of the invention. The description, taken with the drawing will make it apparent to those skilled in the mechanical arts how the several forms of the invention may be embodied in practice. Specifically, the detailed showing is not to be taken as a limitation upon the scope of the invention which is defined, rather, by the appended claims forming, along with a drawing, a part of this specification.

In FIG. 1, the example of the desolder implement 10 illustrated includes a thin-walled metal cylindrical body 12 having a forward, tip end 14 and a rear, bushing end 16. A tip fitting member 18 is shown removably secured within the forward end 14 and includes, for that purpose, a large diameter, short, cylindrical retainer portion 20 and a retaining shoulder portion 22. A small diameter portion 24 extends forwardly from the main portion of the fitting member and a solder inlet, air duct 26 extends axially through the entire fitting.

A piston body 28 is disposed axially sliding within the cylindrical body 12 and includes an O-ring piston ring 30 retained within a retaining groove 32 which has a conically tapered base surface 34 concentric with the axis of the body 12 and having a rearwardly convergent configuration as shown. The taper permits forward travel of the piston body with minimum impedance with regard to sidewall friction and sealed air pump effects, while automatically providing a tight air pump seal in its rearward travel because the frictional drag draws the piston O-ring relatively axially forwardly to maximize its diameter and air seal relation with respect to the inner wall of the cylindrical body 12. Further details of the piston body 28 are discussed below in connection with the more detailed view of FIG. 2. It may be noted here, however, that the piston body may be fabricated by molding it from a plastic and that a tip self cleaning rod member 36 extends axially through the entire piston body for automatically cleaning the duct 26 during each cocking stroke. The rod member 36 may be secured to the piston body by an opposed pair of self-threading nuts 38, 40, the latter being utilized also to retain the forward end of a tension spring shown below in the subsequent FIGS.

A hollow cocking shaft 42 is disposed within and retained and guided by a rear bushing member 44. The cocking shaft may be pushed forwardly inwardly to its position shown for cocking the piston member 28 in its forward position as shown. Throughout its axial travel, the cocking shaft is guided by an elongate guide groove 46 and its relationship with an angularly fixed guide pin 48 firmly retained by the bushing member 44. The forward end of the guide groove 46 is terminated in a short, right-angle locking portion 50.

The rear end of the cocking shaft 42 is shown fitted with a cocking knob 52 which is frictionally resistively rotatable with respect to the cocking shaft whereby the airflow rate from therewithin may be controlled by the degree of registration between a valve opening 54 through the cocking knob and an axially alined like opening 56 formed through the sidewall of the cocking shaft as shown.

The bushing member 44 includes a rear, full diameter portion 58 and a forwardly extending thin-walled portion 60 firmly retained within the rear portion 16 of the cylindrical portion 12. As shown below, the angular disposition of the bushing member 44, its guide pin 48, and its forwardly vectored end portions 62 is fixed with respect to the body 12.

Referring to FIG. 2, the piston body 28 is seen to include a transverse bore 64 for retaining a trigger member 66 and a trigger compression spring 68. The trigger member 66 is retained within the bore 64 by the axial passage therethrough of the tip-cleaning-rod member 36 and its relationship with a vertically elongated rod-receiving aperture 70 formed transversely through the trigger member 66.

The vertical elongation of the rod-receiving aperture 70 is characterized by permitting depression of the trigger member into the bore 64 against the compression spring 68 so that the piston body 28 may travel axially freely within the body 12 except when the trigger member 66 projects outwardly, as shown in the FIG., through a trigger-engaging aperture 72 formed in the forward portion 14 of the body 12. The upper, or outer, end of the trigger member 66 is rounded as shown to facilitate its release against the outward force of the spring 68 for rearward travel of the piston body 28.

The forward edge 74 of the trigger aperture 72 may be canted outwardly, as shown, whereby the piston body may be freely pushed further forwardly, when desired, for ejecting the tip fitting 18 as for its replacement or for cleaning the tip fitting 18 as for its replacement or for cleaning or lubricating the barrel of the body 12. As indicated earlier, the retaining nut 40 is, in this example, utilized for securing the forward end of the main tension spring 76.

The trigger-engaging aperture 72 may be sealed against intrusion of air during the vacuum stroke by a disc 78 of rubber or neoprene. However, it has been found practical in some embodiments to delete the sealing disc because the trigger finger of the operator inherently substantially seals the passage during piston flyback.

The rear portion of the piston body 28 is shown horizontally relieved to form a female indexing trough 80 which is engaged by the forwardly similarly vectored end portion 82 (see FIG. 1) of the cocking shaft 42 during the cocking stroke and at the end of the flyback vacuum stroke as described subsequently herein.

In FIG. 3, the implement is shown in exactly the same disposition as in the previous FIGS. except that the cocking shaft has been withdrawn rearwardly as far as the fixed guide pin 48 in the guide groove 46 will permit. The cocking shaft is then rotated a few degrees counterclockwise whereby the locking portion 50 of the groove is engaged lockingly by the pin 48 as shown. In this position the tension spring 76 is in its maximum energy storage disposition stretched between the piston body 28 and the rear end 84 of the cocking shaft 42. It may be noted that the spring is thusly stably held by virtue of the trigger member 66 in engagement with the aperture 72 and the locking engagement of the guide pin 48 with the guide groove portion 50. Depression of the trigger by the operator's finger tip will cause the flyback of the piston body with resultant impulse flow of air inwardly through the duct 26 of the tip fitting 18.

Referring to FIG. 4, the schematic, partially axially-exploded view illustrates the angular relation of the forwardly vectored portions 82 and 62 of the cocking shaft 42 and bushing member 44, respectively, with respect to each other and the indexing trough 80 of the piston body 28. The vector trough portions 62, 80 are angularly alined while the partially-rotated cocking shaft vectored portions 82 are angularly canted with respect to both. The forward extension of the vectored portions 62, 82 is approximately equal, however, so that upon flyback of the piston body 28, its indexing trough 80 first impacts the portions 82 of the cocking shaft and rotates the shaft until angular alinement of all three elements is achieved.

In the latter relation, as illustrated in FIG. 6, the cocking shaft is automatically enabled for immediate recocking of the piston body since the guide pin 48 is no longer engaged by the groove portion 50 but is, in fact in alinement again with the main guide groove portion 46.

With brief reference back to FIG. 5, the concentric relationships of the several elements of the implement are illustrated with respect to the reference lines 5–5 of FIG. 3. The outer metallic body 12 is shown grooved at 86 to receive and angularly index the guide pin 48 which is permanently held by the thin-wall portion 60 of the plastic bushing member 44. The radially inner tip of the pin 48 is shown in engagement with the locking portion 50 of the guide groove 46 formed in the hollow cocking shaft 42 within which is shown disposed the tension spring 76 and through which may be seen the cocking knob 52.

There have thus been disclosed and described a number of the structural aspects of an example of a vacuum stroke desolder apparatus which achieve the objects and exhibit the advantages set forth hereinabove.

I. claim:

1. Vacuum stroke desoldering apparatus comprising:
   a tubular body member having a rear bushing end and a forward tip end;
   tip end means carried by said body member contiguously to said tip end and having a solder inlet duct formed therethrough in airflow communication between the external environmental atmosphere and the interior of said tubular body member;
   bushing means carried by said body member contiguously to said rear end thereof;
   piston means disposed within said body member and being longitudinally slidable therewithin in an air-driving relation with respect to said airflow through said solder inlet duct;
   cocking shaft means carried by said body member and having a length of the order of that of said body member and including a rear outer end disposed rearwardly of said bushing means, and a forward end disposed internally of said body member and forwardly of said bushing means;
   spring means carried by said body member for urging said piston means and said cocking shaft means toward each other;
   cocking shaft holding means carried by said body member for holding said cocking shaft means rearwardly and having:
      externally actuable shaft latching means, and
      internally actuable shaft unlatching means; and
   piston holding means carried by said body member for holding said piston means forwardly therewithin and having:
      internally actuable piston latching means, and
      externally actuable piston unlatching means, said internally actuable cocking shaft unlatching means including impact responsive means engageable with said piston means for causing said unlatching when said impact means is engaged by said piston means during its rearward vacuum stroke travel.

2. The invention according to claim 1 in which said tip end means includes a tip end fitting which is removably carried by said body member coaxially therewith and through which said solder inlet duct is concentrically formed as an axial bore.

3. The invention according to claim 1 in which said cocking shaft means is carried coaxially by said body member.

4. The invention according to claim 1 in which said externally actuable cocking shaft latching means and said internally actuable cocking shaft unlatching means are of the character structurally to be actuated by rotation by small fractions of a revolution of said cocking shaft means about the axis of said tubular body member.

5. The invention according to claim 4 in which said externally actuable cocking shaft latching means is of the character to latch responsive to manual rotational force applied to said rear outer end of said cocking shaft means.

6. The invention according to claim 4 in which said internally actuable cocking shaft unlatching means is further of the character to unlatch responsive to rotational force applied thereto by said piston means.

7. The invention according to claim 4 which further includes guide pin means and guide groove means carried one by said body member and one by said cocking shaft means and being of the character structurally cooperatively to control the angular disposition, with respect to rotation about said axis, of said cocking shaft means as a function of its displacement axially with respect to said body member.

8. The invention according to claim 1 in which said internally and externally actuable, respectively, piston latching and unlatching means includes a trigger member carried by said piston means and a trigger-receiving aperture formed in said body member contiguously to said forward tip and thereof; said trigger member being of the character to be resiliently laterally movable outwardly for self engagement in longitudinal piston holding relation with the edges of said aperture, and for manual selective disengagement therefrom.

9. The invention according to claim 4 in which the rear portions of said piston means are formed to provide a cocking shaft engaging trough disposed laterally thereacross.

10. The invention according to claim 9 in which the forward portions of said cocking shaft means are vectored forwardly in a manner structurally to engage at least partially congruently and rotationally drivably said trough of said piston means.